Nov. 29, 1927.
V. TEDESCHI
1,650,968
CIRCUIT CLOSER
Filed May 15, 1924
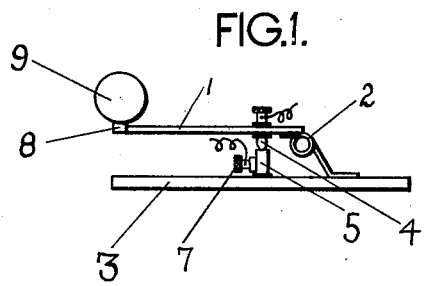
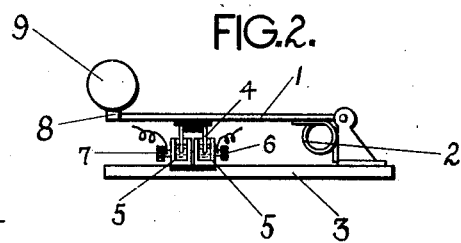
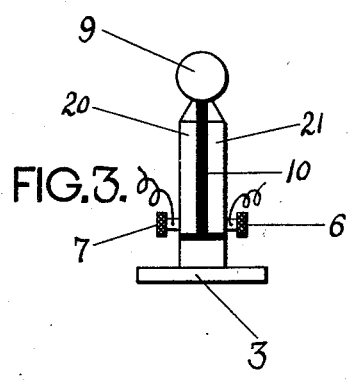
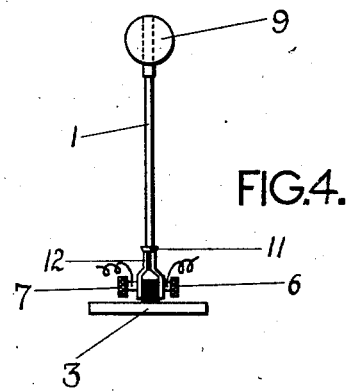
Inventor
Virgilio Tedeschi
By Emil Bömelycke
Attorney Patented Nov. 29, 1927.

1,650,968

UNITED STATES PATENT OFFICE.

VIRGILIO TEDESCHI, OF BUENOS AIRES, ARGENTINA.

CIRCUIT CLOSER.

Application filed May 15, 1924, Serial No. 713,625, and in Italy February 12, 1924.

My present invention relates to seismic valves, its main object being to provide a very simple device by means of which the electric current or gas supplies may be automatically cut-off when an earthquake or similar seismic disturbance of a precalculated intensity occurs.

Terrible as is the destruction wrought by the earthquake proper, the fires which follow as a most unavoidable consequence thereof often cause more losses in life and homes. Such fires are difficult if not impossible to extinguish, by reason of the numerous centers of origin and the confusion resulting therefrom and also due to the breaking of the water mains.

Experience has shown that most of such fires have resulted from the breaking of live wires inside the buildings which results in the formation of short circuits and from the ignition of the gas escaping from broken pipes.

In order to avoid such results I propose the use of very simple devices by means of which the electric current and gas supply may be automatically cut off, said safety devices being put in operation by a seismic disturbance of a predetermined extent.

Said devices should be placed outside of the buildings, a device being connected with each of the electric or gas main supplies. Similar devices might be also advantageously used in the outgoing mains of the electric and gas works.

An individual apparatus for the separate buildings should always be used, particularly in the case of gas cut-off devices for the reason that even after the gas has been cut-off at the main center of supply, the residual pressure in the big pipes would be sufficient to cause a dangerous escape. Furthermore, for both cases of gas and electricity the use of an individual apparatus for each separate building allows an immediate renewal of the supply without a total revision of the electric and gas installations, of a city, the individual valves, being then successively closed after ascertaining that each individual installation is in order.

My present invention may be carried into practice under different embodiments, according to their use and to its variable conditions, all of said embodiments being based on the dislodgment of a weight due to inertia and gravity, said dislodgment originating, either directly or through mechanical means to thus cut off the supply of gas or electricity.

In order that my present invention may be clearly understood and easily carried into practice, some preferred embodiments thereof have been shown in the accompanying drawings, wherein:

Figure 1, shows a device by which in case of an earthquake or a similar seismic disturbance the electric circuit is cut off.

Figure 2 shows a modification of said device.

Figure 3 is a further embodiment in which the weight to be dislodged normally closes the electric circuit.

Figure 4 shows a further modification in which the dislodgeable weight is placed at the end of a vertical arm, said arm normally closing the electric circuit as will be hereafter explained.

Similar characters of reference denote same or like parts throughout the said drawings.

In the embodiment shown in Figure 1, the device consists of an arm or lever member 1 supported at one of its ends by a spring connection 2 on a base 3. Said arm carries a contact member 4 to which one of the terminals 6 of the circuit is fixed. Said contact is adapted to cooperate with a stationary contact member 5 to which the other terminal 7 of the circuit is connected. The lever arm 1 is provided near its free end with a suitable seat 8 on which the weight 9 is adapted to normally rest in stable equilibrium, so as to close the circuit between the contacts 4 and 5. In the event of an earthquake or like seismic disturbance of sufficient extent causing a sudden shock or jar to the building or other support of the apparatus the weight 9 will be shaken from its seat 8, thus allowing the spring 2 to act and break the connection between the contacts 4 and 5 whereby the circuit is interrupted.

The embodiment shown in Figure 2 does not substantially differ from the above except for the fact that the lever member 1 carries a bridge 4 with two contacts dipping into mercury cups 5 to which the terminals 6 and 7 are connected. The working of the device corresponds to the above and needs no further description.

Fig. 3 is another embodiment of the same principle. The gravity actuated body 9 normally closes the circuit between the two upright contact members 20 and 21 mounted on the base 3 and suitably insulated from each other as shown by 10. The upper ends of said upright contacts form a seat for the said body 9 which is of conductive material; the operation of which is obvious.

Fig. 4 shows a further modified embodiment, in which the weight 9 is suitably fixed to the top of a vertical stem 1 the lower end of which being fixed by a soft solder or other weak connection 11 to the terminals 12 of the wire terminals 6 and 7. In case of any seismical disturbance of a predetermined extent, the leverage provided by the stem 1 will cause the weight 9 to break the stem off at its weakest point 11 and thus interrupt the circuit between the contacts 12.

It is obvious that, on the same principle and within the scope of my present invention which has been clearly set forth in the appended claiming clause, many other embodiments may be constructed and used.

The re-establishment of the electrical circuits is obvious and needs no further description.

It is obvious as aforesaid, that the invention is in no way limited to the particular embodiments, thereof shown and described and that many others may be devised and adopted without departing from the scope of the invention which has been clearly set forth in the appended claiming clause.

Having now fully described and ascertained the nature of my present invention and in what manner the same is to be carried into practice, I declare that what I claim and desire to protect by Letters Patent is:—

A seismical device comprising a base; a spring pressed lever having a free end and pivotally supported at the other end on said base; electric contacts on said base and said lever adapted to control an electric circuit; and a body supported directly on and by the free end of said lever adapted, when disturbed, to fall from said lever thereby allowing the lever to break the circuit.

In testimony whereof I affix my signature.

VIRGILIO TEDESCHI.